United States Patent [19]
Breitner et al.

[11] Patent Number: 6,079,776
[45] Date of Patent: Jun. 27, 2000

[54] HEADREST FOR A VEHICLE SEAT

[75] Inventors: Roland Breitner, Herrenberg; Thomas Heckmann, Aidlingen, both of Germany

[73] Assignee: DaimlerChrysler AG, Stuttgart, Germany

[21] Appl. No.: 09/148,983

[22] Filed: Sep. 8, 1998

[30] Foreign Application Priority Data

Sep. 6, 1997 [DE] Germany .......................... 197 39 131

[51] Int. Cl.⁷ .............................................. B60R 21/055
[52] U.S. Cl. ..................................... 297/216.12; 297/408
[58] Field of Search ............................... 297/216.12, 408, 297/391

[56] References Cited

U.S. PATENT DOCUMENTS

| | | | |
|---|---|---|---|
| 3,680,912 | 8/1972 | Matsuura | 297/216.12 X |
| 4,720,146 | 1/1988 | Mawbey et al. | 297/408 X |
| 4,844,544 | 7/1989 | Ochiai | 297/408 |
| 4,861,107 | 8/1989 | Vidwans et al. | 297/408 |
| 5,468,045 | 11/1995 | Weber . | |
| 5,683,141 | 11/1997 | Wakamatsu et al. | 297/408 |
| 5,700,057 | 12/1997 | De Filippo | 297/408 |

FOREIGN PATENT DOCUMENTS

| | | | |
|---|---|---|---|
| 2152202 | 4/1973 | Germany . | |
| 2220267 | 11/1973 | Germany . | |
| 2152202 | 11/1980 | Germany | 297/216.12 |
| 3900495A1 | 7/1990 | Germany . | |
| 55-26927 | 2/1980 | Japan . | |
| 2-31713 | 2/1990 | Japan . | |
| 5-11858 | 2/1993 | Japan . | |
| 9-149837 | 6/1997 | Japan . | |
| 9-182644 | 7/1997 | Japan . | |

OTHER PUBLICATIONS

Search Report, Europe, Dec. 21, 1998.

*Primary Examiner*—Peter R. Brown
*Attorney, Agent, or Firm*—Evenson, McKeown, Edwards & Lenahan, P.L.L.C.

[57] ABSTRACT

A vehicle seat has a supporting bow which can be fixed on the seat side and has a head cushion which is arranged on the end of the supporting bow away from the seat and which can be adjusted in its inclination as desired by the seat user. For securing the inclination adjustment of the head cushion in the event of a crash, an air-filled, volume-variable hollow body is supported between the supporting bow and a cushion support held on the supporting bow by way of a swivel bearing. The hollow body is provided with a throttle opening which counters a shock-type air discharge with an extremely high flow resistance and an air passage of a low flow rate with only a small flow resistance.

17 Claims, 2 Drawing Sheets

HEADREST FOR A VEHICLE SEAT

BACKGROUND AND SUMMARY OF THE INVENTION

This application claims the priority of German application 197 39 131.1-16, filed Sep. 6, 1997, the disclosure of which is expressly incorporated by reference herein.

The invention relates to a headrest for a vehicle seat which is pivotally mounted and includes a cushion and an air filled variable volume hollow body.

In the case of a known headrest of this type (German Patent Document DE 39 00 495 A1), the hollow body constructed as an air bag is used as an actuator for the cushion support whose swivelling position determines the inclination adjustment of the head cushion. The air bag is connected to a compressed-air source by means of a manually operable ventilating and deventilating valve. In addition, the air bag is connected to a compressed-air storage device which, in the event of a crash, abruptly inflates the air bag, whereby the air bag emerges on the bottom side from the head cushion and, in the manner of a hose, extends into the seat user's neck lordosis area in order to achieve an additional support there. The activating of the compressed-air storage device in the event of a crash takes place by means of an acceleration sensor.

In the case of another also known headrest (German Patent Document DE 22 20 267 A1), the elastic hollow body arranged between the cushioning and the supporting bow is filled with a medium, such as a gas or a liquid, and is connected by way of a so-called resistance part with an empty hollow part which also consists of an elastic material, such as rubber, artificial resin, or the like. The elastic material of the hollow part has a larger contraction force than the material of the hollow body. The resistance part may be constructed as a return valve, a control valve, a flap valve, a return flap valve, a backflow valve, or the like which can be opened manually in the opposite direction. In the event of a crash, the shock exercised by he seat user's head onto the head cushion is converted into pressure onto the medium in the hollow body, whereby the medium can flow off by way of the resistance part into the hollow part. As a result, the kinetic force of the head impact onto the head cushion is partially absorbed and its effect onto the sitting person is reduced. For the return flow of the medium, which flows over into the hollow part, back into the hollow body, the resistance part must be opened manually, in which case, because of the higher contraction force of the hollow part material, the medium flows back into the hollow body relieved from the head pressure.

It is an object of the invention, to ensure in the case of a headrest, which has a head cushion of the initially mentioned type which can be adjusted in its inclination, in a constructively simple manner, that, in the event of a crash, the head cushion adjustment is reliably maintained and the adjusted inclination therefore is not reset.

In the case of a headrest of the type referred to above, this object is achieved according to the invention by an arrangement, wherein the swivel bearing of the cushion support is constructed such that, in the case of a normal head contact force, the cushion support maintains its adjusted swivelling position, and wherein the hollow body is provided with a throttle opening which counters a shock-type air discharge with an extremely high flow resistance and counters an air discharge and an air entry of a low flow rate with only a low flow resistance.

The headrest according to the invention has the advantage of a very simple construction. By means of the hollow body with the throttle opening, the inclination of the head cushion can easily be adjusted in the normal case. The construction of the swivel bearing provides that the head cushion adjustment is not changed when the head user places his head against it, but the head cushion maintains the selected adjustment. The hollow body follows the slow swivel movement of the cushion support during the head cushion adjustment, in which case, according to the swivelling direction, because of the low flow resistance of the throttle opening, the air can escape out of the hollow body or represent an afterflow into the hollow body. In the event of a crash, when the head suddenly strikes against the head cushion, the flow resistance of the throttle opening will be so high that air cannot escape to a significant extent. The cushion support with the cushioning is therefore reliably locked and is not displaced toward the rear. The hollow body, which is preferably made of PUR-material, can be produced at reasonable cost, in which case it is either self-inflating in its given shape or is inflated by the cushion support during its swivelling. The throttle opening is easily illustrated and can be implemented by means of a small hole in the hollow body wall.

Other objects, advantages and novel features of the present invention will become apparent from the following detailed description of the invention when considered in conjunction with the accompanying drawings.

DETAILED DESCRIPTION OF THE DRAWINGS

Figure 1:
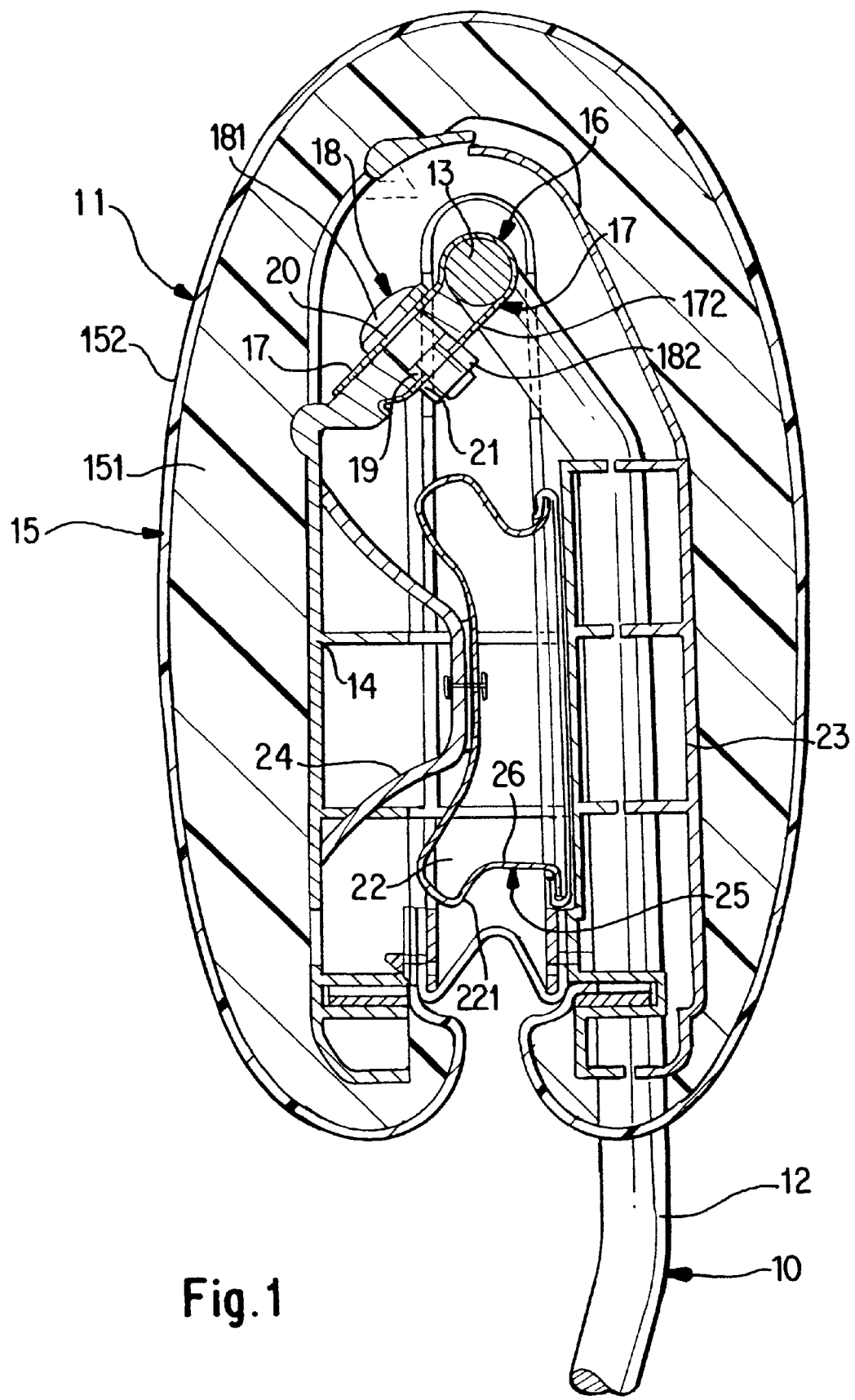
FIG. 1 is a longitudinal sectional view of a headrest with a head cushion situated in the normal position, constructed according to a preferred embodiment of the present invention.
Figure 2:
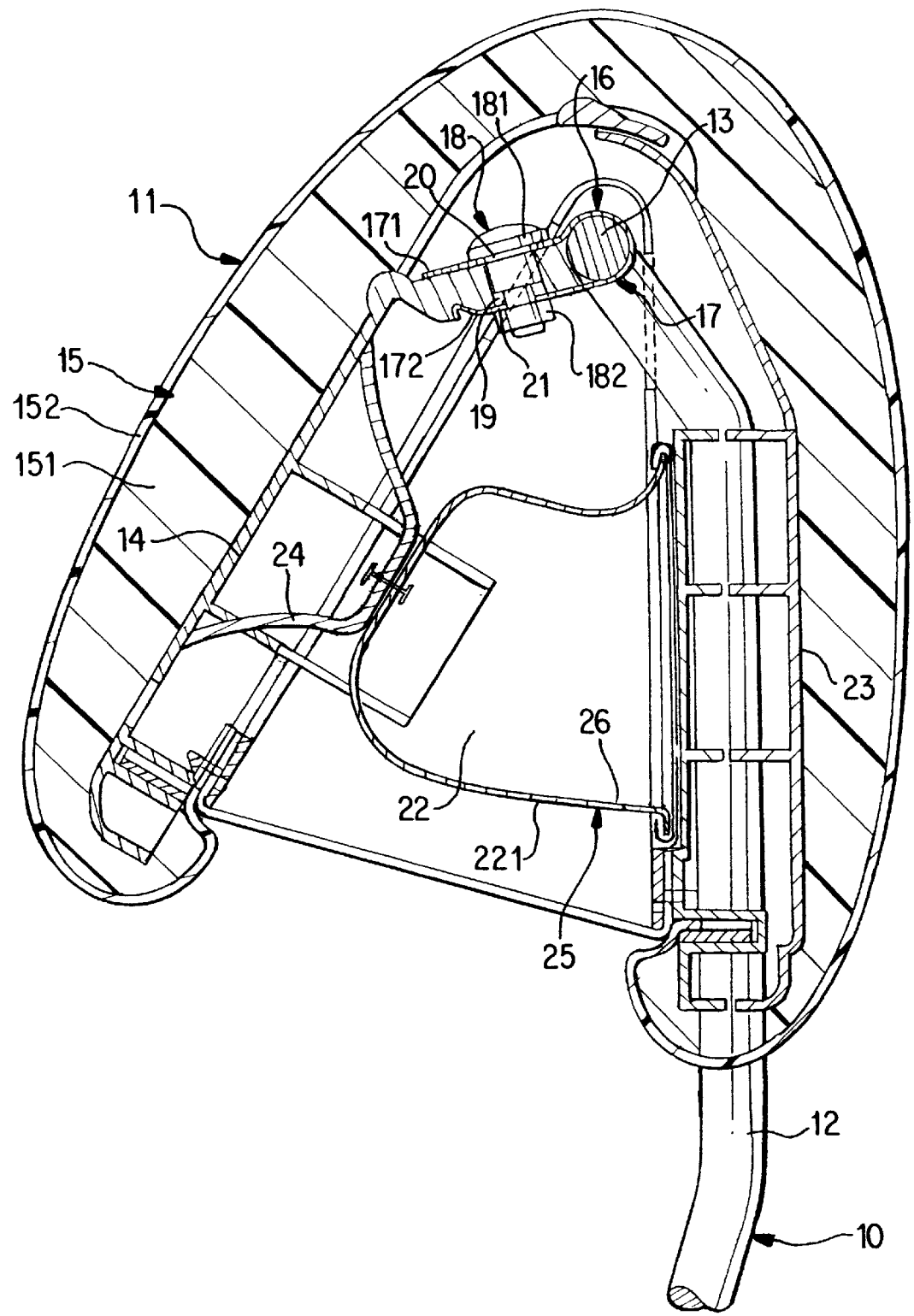
FIG. 2 is the same representation as in FIG. 1 with a maximally adjusted head cushion.

The headrest shown as a longitudinal sectional view in FIGS. 1 and 2 has a supporting bow 10, which is shown only in sections and can be fixed on the seat side, and a head cushion 11 which is arranged on the end of the supporting bow 10 away from the seat. The supporting bow 10 has two parallel holding rods 12 which are connected with one another on the end away from the seat by means of a crossbolt 13 and are inserted into guiding sleeves within the backrest of the vehicle seat. The holding rods 12 are vertically adjustably guided in the guiding sleeves and can be locked in the respective adjusted vertical position. Of the two holding rods 12, only the holding rod 12 is visible which, in the sectional views of FIGS. 1 and 2, is on the right in the driving direction.

The head cushion 11 comprises a cushion support 14 as well as a cushioning 15 which covers the cushion support 14 on its front side facing away from the supporting bow 10 and which, in addition, also reaches over the supporting bow 10 and extends over the back side of the supporting bow 10 facing away from the cushion support 14. The cushioning 15 is composed of a foam material 151 and a cushioning cover 152 spanning the foam material 151, which cushioning cover 152 is fastened at the end side, on the one hand, on the cushioning support 14 and, on the other hand, on the supporting bow 10.

The cushion support 14 is swivellably held on the supporting bow 10 by means of a swivel bearing 16 so that the cushion support 14 can be set at an acute angle of approximately 30°–40° with respect to the supporting bow 10, as outlined in FIG. 2. The swivelling of the cushion support 14 takes place manually, a friction brake integrated in the swivel bearing providing that the respectively adjusted swivel angle of the cushion support 14 is maintained under normal conditions; that is, is not changed by the normal head contact force of the sitting person. The swivel bearing 16 with the friction brake comprises the crossbolt 13 connecting the two holding rods 12 as well as a clamp 17 which encloses the crossbolt 13 in a frictionally engaged manner and is fastened on its two legs 171, 172 by means of a screwed connection 18 on the cushion support 14. In this case, the screw 181 of the screwed connection 18 is fitted through two congruent holes 20, 21 in the legs 171, 172 and a bore 19 in the cushion support 14 and is fixed by a nut 182. By means of this screwed connection 18, the frictional engagement of the clamp 17 on the crossbolt 13 and thus the frictional engagement of the friction brake can also be adjusted which is dimensioned such that it is larger than the normal head contact force of a seat user.

In the event of a crash, when the seat user's head impacts on the head cushion 11 in a shock-type manner, the frictional force of the friction brake in the swivel bearing 16 will not be sufficient for absorbing this shock without any resetting of the cushion support 14. This creates an additional free path for the head during the throw-back which represents an additional danger potential to the sitting person. For preventing such an unintentional resetting of the cushion support 14 in the event of a crash, a hollow body 22 made of an elastic material is integrated in the cushion support and is arranged between the supporting bow 10 and the cushion support 14. In the embodiment of FIGS. 1 and 2, the hollow body 22 is, on the one side, fixed to a supporting structure 23 which is fastened to the supporting bow 10 and which extends transversely between the two holding rods 12 on the supporting bow 10, and, on the other side, is fixed to the cushion support 14, specifically to a machined part 24 which is fixedly connected with the cushion support 14, so that the hollow body 22 is supported, in each swivelling position of the cushion support 14, always between the supporting bow 10 and the cushion support. In this case, the fixing takes place on mutually opposite wall areas of the hollow body wall 221. In an alternative embodiment, the hollow body 22 may also be constructed to be spring-elastic with a self-inflating shaping, in which case the spring-elastic restoring force of the hollow body must then be dimensioned to be smaller than the frictional force of the friction brake in the swivel bearing 16. In this case, it would be sufficient to fasten the hollow body 22 either to the supporting structure 23 or to the machined part 24, in which case it will then, because of its spring-elastic restoring force, rest automatically against the respective other part, thus against the machined part 24 or against the supporting structure 23.

The hollow body 22 is provided with a throttle opening 25 which is designed such that it counters a shock-type air discharge from the hollow body 22 with an extremely high flow resistance and counters an air passage with a low flow rate with only a low flow resistance. This throttle opening 25 is implemented in FIGS. 1 and 2 as a simple bore 26 in the hollow body wall 221. By means of this construction of the throttle opening 25, in the normal case, that is, unloaded by the sitting person's head, the head cushion 11 can easily be adjusted in its inclination, in which case, starting from the normal position of the head cushion 11 illustrated in FIG. 1, a desired angle of incidence of the cushion support 14 with respect to the supporting bow 10 can be adjusted. The maximal incidence of the cushion support 14 is illustrated in FIG. 2. The hollow body 22 fastened to the supporting structure 23 and the machined part 24 follows the slow swivelling movement of the cushion support 14, in which case, because of the low flow resistance of the throttle opening 25, air can flow without any problem into the hollow body 22 or out of the hollow body 22. In the event of a crash, when the sitting person's head is thrown in a shock-type manner against the head cushion 11 whose inclination is adjusted, because of the propagation of pressure into the air volume enclosed by the hollow body 22, a shock-type air discharge occurs through the throttle opening 25. However, the throttle opening 25 presents an extremely high flow resistance to such a high flow rate so that air cannot flow to a significant extent out of the hollow body 22. Thus, despite the kinetic energy of the head impact, which by far exceeds the frictional force of the friction brake of the swivel bearing, the cushion support 14 reliably remains in its respective adjusted swivelling position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Headrest for a vehicle seat, comprising:
   a supporting bow which can be fixed on a seat side,
   a head cushion which is arranged on an end of the supporting bow away from the seat and which has a cushion support held on the supporting bow for frictionally adjusting the inclination of the head cushion by way of a swivel bearing and a cushioning which covers the cushion support at least on its front side facing away from the supporting bow, and
   an air-filled volume-variable hollow body which is secured between the supporting bow and the cushion support such that the hollow body expands or contracts depending upon the position to which the cushion is swivelled,
   wherein the swivel bearing of the cushion support is constructed such that, in the case of a normal head contact force, the cushion support maintains an adjusted swivelling position, and
   wherein the hollow body is provided with a throttle opening which counters a shock-type air discharge with an extremely high flow resistance and counters an air discharge and an air entry of a low flow rate with only a low flow resistance.

2. Headrest according to claim 1, wherein a friction brake is integrated in the swivel bearing, the frictional force of the friction brake being higher than the normal head contact force.

3. Headrest according to claim 2, wherein the swivel bearing with the friction brake comprises a round bolt held on the supporting bow and a clamp which reaches around the round bolt in a frictionally engaging manner, which clamp is fastened on the cushion support.

4. Headrest according to claim 3, wherein the hollow body is bounded by a body wall and is fixed to the supporting bow on one wall area of its body wall and to the cushion support on a mutually opposite wall area of its body wall.

5. Headrest according to claim 3, wherein the hollow body is bounded by a body wall and has a spring-elastic construction and, by means of its body wall, is fastened to the supporting bow and/or to the cushion support.

6. Headrest according to claim 5, wherein a spring-elastic restoring force of the hollow body is lower than the frictional force of the friction brake in the swivel bearing.

7. Headrest according to claim 3, wherein the throttle opening is formed by a bore in a hollow body wall of the hollow body.

8. Headrest according to claim 2, wherein the hollow body is bounded by a body wall and is fixed to the supporting bow on one wall area of its body wall and to the cushion support on a mutually opposite wall area of its body wall.

9. Headrest according to claim 2, wherein the hollow body is bounded by a body wall and has a spring-elastic construction and, by means of its body wall, is fastened to the supporting bow and/or to the cushion support.

10. Headrest according to claim 9, wherein a spring-elastic restoring force of the hollow body is lower than the frictional force of the friction brake in the swivel bearing.

11. Headrest according to claim 10, wherein the throttle opening is formed by a bore in a hollow body wall of the hollow body.

12. Headrest according to claim 2, wherein the throttle opening is formed by a bore in a hollow body wall of the hollow body.

13. Headrest according to claim 1, wherein the hollow body is bounded by a body wall and is fixed to the supporting bow on one wall area of its body wall and to the cushion support on a mutually opposite wall area of its body wall.

14. Headrest according to claim 13, wherein the throttle opening is formed by a bore in a hollow body wall of the hollow body.

15. Headrest according to claim 1, wherein the hollow body is bounded by a body wall and has a spring-elastic construction and, by means of its body wall, is fastened to the supporting bow and/or to the cushion support.

16. Headrest according to claim 15, wherein the throttle opening is formed by a bore in a hollow body wall of the hollow body.

17. Headrest according to claim 1, wherein the throttle opening is formed by a bore in a hollow body wall of the hollow body.

* * * * *